United States Patent
Kekre et al.

(10) Patent No.: US 7,103,796 B1
(45) Date of Patent: Sep. 5, 2006

(54) PARALLEL DATA CHANGE TRACKING FOR MAINTAINING MIRRORED DATA CONSISTENCY

(75) Inventors: Anand A. Kekre, Pune (IN); Michael E. Root, San Jose, CA (US); Arun M. Rokade, Maharashtra (IN)

(73) Assignee: VERITAS Operating Corporation, Mountain View, CA (US)

( * ) Notice: Subject to any disclaimer, the term of this patent is extended or adjusted under 35 U.S.C. 154(b) by 497 days.

(21) Appl. No.: 10/233,741

(22) Filed: Sep. 3, 2002

(51) Int. Cl.
*G06F 11/00* (2006.01)

(52) U.S. Cl. .............................................. 714/6; 714/5
(58) Field of Classification Search ............... 714/6, 714/5, 8, 12–13; 711/112, 161–162, 165; 707/202, 204
See application file for complete search history.

(56) References Cited

U.S. PATENT DOCUMENTS

| | | | |
|---|---|---|---|
| 5,649,152 A | 7/1997 | Ohran et al. | 395/441 |
| 5,835,953 A * | 11/1998 | Ohran | 711/162 |
| 5,875,479 A | 2/1999 | Blount et al. | 711/162 |
| 5,915,098 A * | 6/1999 | Palmer et al. | 709/247 |
| 6,073,222 A | 6/2000 | Ohran | 711/162 |
| 6,085,298 A | 7/2000 | Ohran | 711/162 |
| RE37,601 E | 3/2002 | Eastridge et al. | 714/6 |
| 6,728,898 B1 * | 4/2004 | Tremblay et al. | 714/6 |
| 6,732,245 B1 * | 5/2004 | Kaiya et al. | 711/162 |
| 6,779,093 B1 | 8/2004 | Gupta | 711/162 |
| 2003/0014433 A1 | 1/2003 | Teloh et al. | 707/204 |
| 2003/0061366 A1 | 3/2003 | Musante et al. | 709/230 |
| 2003/0126388 A1 | 7/2003 | Yamagami | 711/162 |
| 2003/0158869 A1 * | 8/2003 | Micka | 707/203 |

* cited by examiner

*Primary Examiner*—Dieu-Minh Le
(74) *Attorney, Agent, or Firm*—Campbell Stephenson Ascolese LLP

(57) ABSTRACT

A method, system, computer system and computer program product to maintain consistency between mirrored copies of data. A first data change map identifies regions that are about to be updated. If a system failure occurs during the update, the first data change map identifies regions that were being changed so that only those regions can be synchronized to restore consistency between the mirrored copies of data. A second data change map tracks changes made to data after a snapshot of the mirrored data is taken. This second data change map enables the mirrored copies of data to be synchronized without copying all data from one mirrored copy to another. The first and second data change maps are updated in parallel to reduce processing time and overhead. This parallel processing enables fast restoration and synchronization of mirrored copies of data, while having minimal effect on performance of applications using the data.

25 Claims, 7 Drawing Sheets

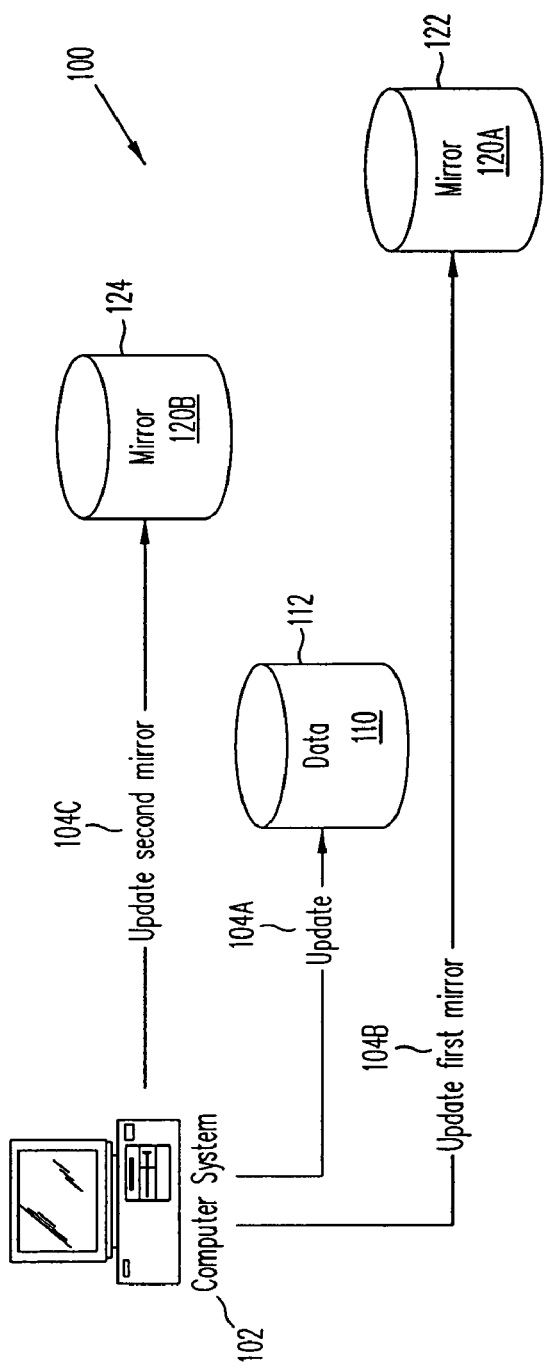
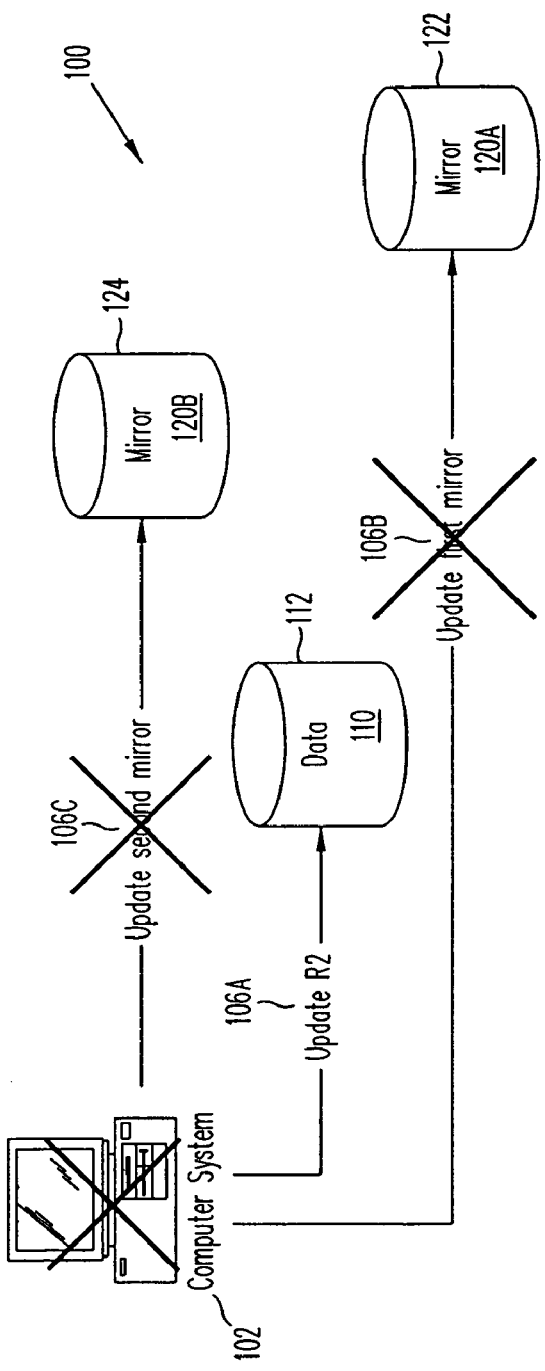

| Event 410 | Primary Data 420 | | | | Mirror Data 430 | | | | Accumulator Map 440 | | | | Dirty Region Map 450 | | | |
|---|---|---|---|---|---|---|---|---|---|---|---|---|---|---|---|---|
| 4.1 Begin write to R2 | - | - | - | - | - | - | - | - | 01 | 00 | 00 | 00 | 01 | 00 | 00 | 00 |
| 4.2 Write A to primary R2 | A | - | - | - | - | - | - | - | 01 | 00 | 00 | 00 | 01 | 00 | 00 | 00 |
| 4.3 Write A to mirror R2 | A | - | - | - | A | - | - | - | 01 | 00 | 00 | 00 | 01 | 00 | 00 | 00 |
| 4.4 Clear Dirty Region Map | A | - | - | - | A | - | - | - | 01 | 00 | 00 | 00 | 00 | 00 | 00 | 00 |
| 4.5 Begin write to R5 | A | - | - | - | A | - | - | - | 01 | 00 | 10 | 00 | 00 | 00 | 10 | 00 |
| 4.6 Write B to primary R5 | A | B | - | - | A | - | - | - | 01 | 00 | 10 | 00 | 00 | 00 | 10 | 00 |
| 4.7 Write B to mirror R5 | A | B | - | - | A | B | - | - | 01 | 00 | 10 | 00 | 00 | 00 | 10 | 00 |
| 4.8 Clear Dirty Region Map | A | B | - | - | A | B | - | - | 01 | 00 | 10 | 00 | 00 | 00 | 00 | 00 |
| 4.9 Begin write to R8 | A | B | - | D | A | B | - | - | 01 | 00 | 10 | 01 | 00 | 00 | 00 | 01 |
| 4.10 Write D to primary R8 | A | B | - | D | A | B | - | - | 01 | 00 | 10 | 01 | 00 | 00 | 00 | 01 |
| 4.11 Write D to mirror R8 | A | B | - | D | A | B | - | D | 01 | 00 | 10 | 01 | 00 | 00 | 00 | 01 |
| 4.12 Clear Dirty Region Map | A | B | - | D | A | B | - | D | 01 | 00 | 10 | 01 | 00 | 00 | 00 | 00 |
| 4.13 Begin write to R5 | A | B | - | D | A | B | - | D | 01 | 00 | 10 | 01 | 00 | 00 | 10 | 00 |

| Event 510 | Primary Data 520 | | | | | | Mirror Data 530 | | | | | | Accumulator Map 540 | | | | | Dirty Region Map 550 | | | | |
|---|---|---|---|---|---|---|---|---|---|---|---|---|---|---|---|---|---|---|---|---|---|---|
| 5.1 Begin write to R2 | -- | -- | -- | -- | -- | -- | -- | -- | -- | -- | -- | -- | 01 | 00 | 00 | 00 | 00 | 01 | 00 | 00 | 00 | 00 |
| 5.2 Write A to primary R2 | A | -- | -- | -- | -- | -- | -- | -- | -- | -- | -- | -- | 01 | 00 | 00 | 00 | 00 | 01 | 00 | 00 | 00 | 00 |
| 5.3 Write A to mirror R2 | A | -- | -- | -- | -- | -- | A | -- | -- | -- | -- | -- | 01 | 00 | 00 | 00 | 00 | 01 | 00 | 00 | 00 | 00 |
| 5.4 Clear Dirty Region Map | A | -- | -- | -- | -- | -- | A | -- | -- | -- | -- | -- | 01 | 00 | 00 | 00 | 00 | 00 | 00 | 00 | 00 | 00 |
| 5.5 Begin write to R5 | A | -- | -- | -- | -- | -- | A | -- | -- | -- | -- | -- | 01 | 00 | 00 | 10 | 00 | 00 | 00 | 00 | 10 | 00 |
| 5.6 Write B to primary R5 | A | -- | -- | -- | B | -- | A | -- | -- | -- | -- | -- | 01 | 00 | 00 | 10 | 00 | 00 | 00 | 00 | 10 | 00 |
| 5.7 System Failure | A | -- | -- | -- | B | -- | A | -- | -- | -- | -- | -- | 01 | 00 | 00 | 10 | 00 | 00 | 00 | 00 | 10 | 00 |

FIG. 6

| Event 610 | Primary Data 620 | | | | | | Mirror Data 630 | | | | | | Accumulator Map 640 | | | | | Dirty Region Map 650 | | | | |
|---|---|---|---|---|---|---|---|---|---|---|---|---|---|---|---|---|---|---|---|---|---|---|
| 6.1 Begin write to R2 | -- | -- | -- | -- | -- | -- | -- | -- | -- | -- | -- | -- | 01 | 00 | 00 | 00 | 00 | 01 | 00 | 00 | 00 | 00 |
| 6.2 Write A to primary R2 | A | -- | -- | -- | -- | -- | -- | -- | -- | -- | -- | -- | 01 | 00 | 00 | 00 | 00 | 01 | 00 | 00 | 00 | 00 |
| 6.3 Write A to mirror R2 | A | -- | -- | -- | -- | -- | A | -- | -- | -- | -- | -- | 01 | 00 | 00 | 00 | 00 | 01 | 00 | 00 | 00 | 00 |
| 6.4 Begin write to R5 | A | -- | -- | -- | -- | -- | A | -- | -- | -- | -- | -- | 01 | 00 | 00 | 10 | 00 | 01 | 00 | 00 | 10 | 00 |
| 6.5 Write B to primary R5 | A | -- | -- | -- | B | -- | A | -- | -- | -- | -- | -- | 01 | 00 | 00 | 10 | 00 | 01 | 00 | 00 | 10 | 00 |
| 6.6 Write B to mirror R5 | A | -- | -- | -- | B | -- | A | -- | -- | -- | B | -- | 01 | 00 | 00 | 10 | 00 | 01 | 00 | 00 | 10 | 00 |
| 6.7 System Failure | A | -- | -- | -- | B | -- | A | -- | -- | -- | B | -- | 01 | 00 | 00 | 10 | 00 | 01 | 00 | 00 | 10 | 00 |

| Event 710 | Primary Data 720 | | | Mirror Data 730 | | | Accumulator Map 740 | | | | | Dirty Region Map 750 | | | | |
|---|---|---|---|---|---|---|---|---|---|---|---|---|---|---|---|---|
| 7.1 Begin write to R2 | - | - | - | - | - | - | 01 | 00 | 00 | 00 | 00 | 01 | 00 | 00 | 00 | 00 |
| 7.2 Write A to primary R2 | A | - | - | - | - | - | 01 | 00 | 00 | 00 | 00 | 01 | 00 | 00 | 00 | 00 |
| 7.3 Write A to mirror R2 | A | - | - | A | - | - | 01 | 00 | 00 | 00 | 00 | 01 | 00 | 00 | 00 | 00 |
| 7.4 Begin write to R5 | A | - | - | A | - | - | 01 | 00 | 10 | 00 | 00 | 01 | 00 | 10 | 00 | 00 |
| 7.5 Write B to primary R5 | A | B | - | A | - | - | 01 | 00 | 10 | 00 | 00 | 01 | 00 | 10 | 00 | 00 |
| 7.6 Write B to mirror R5 | A | B | - | A | B | - | 01 | 00 | 10 | 00 | 00 | 01 | 00 | 10 | 00 | 00 |
| 7.7 Clear Accumulator Map | A | B | - | A | B | - | 00 | 00 | 00 | 00 | 00 | 01 | 00 | 10 | 00 | 00 |
| 7.8 Begin write to R8 | A | B | - | A | B | - | 00 | 00 | 00 | 01 | 01 | 01 | 00 | 10 | 10 | 01 |
| 7.9 Write D to primary R8 | A | B | D | A | B | - | 00 | 00 | 00 | 01 | 01 | 01 | 00 | 10 | 10 | 01 |
| 7.10 Write D to mirror R8 | A | B | D | A | B | D | 00 | 00 | 00 | 01 | 01 | 01 | 00 | 10 | 10 | 01 |

PARALLEL DATA CHANGE TRACKING FOR MAINTAINING MIRRORED DATA CONSISTENCY

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

CROSS-REFERENCE TO RELATED APPLICATIONS

This application relates to application Ser. No. 10/207,451, filed on Jul. 29, 2002, entitled "Maintaining Persistent Data Change Maps for Fast Data Synchronization and Restoration" and naming Michael E. Root, Anand A. Kekre, Arun M. Rokade, John A. Colgrove, Ronald S. Karr and Oleg Kiselev as inventors, the application being incorporated herein by reference in its entirety.

This application relates to application Ser. No. 10/207,432, filed on Jul. 29, 2002, entitled "Symmetrical Data Change Tracking" and naming Michael E. Root, Gopal Sharma and Oleg Kiselev as inventors, the application being incorporated herein by reference in its entirety.

BACKGROUND OF THE INVENTION

Information drives business. For businesses that increasingly depend on data and information for their day-to-day operations, unplanned downtime due to data loss or data corruption can hurt their reputations and bottom lines. Businesses are becoming increasingly aware of these costs and are taking measures to plan for and recover from data loss. Often these measures include protecting primary, or production, data, which is 'live' data used for operation of the business. Copies of primary data are made on different physical storage devices, and often at remote locations, to ensure that a version of the primary data is consistently and continuously available.

Typical uses of copies of primary data include backup, Decision Support Systems (DSS) data extraction and reports, testing, and trial failover (i.e., testing failure of hardware or software and resuming operations of the hardware or software on a second set of hardware or software). These copies of data are preferably updated as often as possible so that the copies can be used in the event that primary data are corrupted, lost, or otherwise need to be restored.

Two areas of concern when a hardware or software failure occurs, as well as during the subsequent recovery, are preventing data loss and maintaining data consistency between primary and backup data storage areas. One simple strategy includes backing up data onto a storage medium such as a tape, with copies stored in an offsite vault. Duplicate copies of backup tapes may be stored onsite and offsite. However, recovering data from backup tapes requires sequentially reading the tapes. Recovering large amounts of data can take weeks or even months, which can be unacceptable in today's 24×7 business environment.

More robust, but more complex, solutions include mirroring data from a primary data storage area to a backup, or "mirror," storage area in real-time as updates are made to the primary data. FIG. 1A provides an example of a storage environment 100 in which data 110 are mirrored. Computer system 102 processes instructions or transactions to perform updates, such as update 104A, to data 110 residing on data storage area 112.

A data storage area may take form as one or more physical devices, such as one or more dynamic or static random access storage devices, one or more magnetic or optical data storage disks, or one or more other types of storage devices. With respect to backup copies of primary data, preferably the storage devices of a volume are direct access storage devices such as disks rather than sequential access storage devices such as tapes.

In FIG. 1A, two mirrors of data 110 are maintained, and corresponding updates are made to mirrors 120A and 120B when an update, such as update 104A, is made to data 110. For example, update 104B is made to mirror 120A residing on mirror data storage area 122, and corresponding update 104C is made to mirror 120B residing on mirror data storage area 124 when update 104A is made to data 110. As mentioned earlier, each mirror should reside on a separate physical storage device from the data for which the mirror serves as a backup, and therefore, data storage areas 112, 122, and 124 correspond to three physical storage devices in this example. If one of data storage areas 112, 122, and 124 is corrupted or suffers a loss of data, one of the other two mirrors can be used to provide the data.

FIG. 11B shows a potential problem that can occur when data are mirrored. Assume that after making update 106A to region 2 (R2) of data 110, computer system 102 crashes, as shown by the X through computer system 102. Neither region 2 of mirror 120A nor region 2 of mirror 120B is updated in corresponding transactions 106B and 106C, also shown by an X through the transaction. This failure leaves regions 2 of mirrors 120A and 120B in an inconsistent state from the state of region 2 of data 110. When computer system 102 returns online, data read from region 2 of data 110 are different from data read from corresponding regions 2 of mirrors 120A and 120B. Measures to recover from inconsistencies in mirrored data due to system crashes are necessary to restore data 110, mirror 120A, and mirror 120B to consistent states. Ensuring data consistency is critical to maintaining highly available data.

One method of restoring consistency between mirrors is to use one of the three sources of data—data 110, mirror 120A or 120B—as the valid copy and to copy data from the valid data source to the other two data sources. For example, data could be copied from data 110 to the two mirrors 120A and 120B. Typical prior art solutions have involved copying all of the data from the valid data source to the other data sources to ensure that all data are consistent. However, copying all data from snapshots can be unacceptably time-consuming when dealing with very large volumes of data, such as terabytes of data. In addition, copying large volumes of data diverts resources away from maintaining current versions of primary data during the restoration. A faster way to restore and/or synchronize large volumes of data is needed.

Various techniques have been developed to speed the synchronization process of two inconsistent sets of data. One technique involves taking a snapshot of source data such as data 110 at a given point in time, and then tracking regions changed in the source data with reference to the snapshot. Only the changed regions are copied to synchronize the snapshot with the source data. Such a technique is described in further detail in related application Ser. No. 10/207,461, filed on Jul. 29, 2002, entitled "Maintaining Persistent Data Change Maps for Fast Data Synchronization and Restoration" and naming Michael E. Root, Anand A.

Kekre, Arun M. Rokade, John A. Colgrove, Ronald S. Karr and Oleg Kiselev as inventors, the application being incorporated herein by reference in its entirety.

A snapshot of data can be made by "detaching" a mirror of the data so that the mirror is no longer being updated. FIG. 2 shows storage environment 100 after detaching mirror 120B. Detached mirror 120B serves as a snapshot of data 110 as it appeared at the point in time that mirror 120B was detached. When another update is made to data 110, a corresponding update 106B is made to mirror 120A. However, no update is made to detached mirror 120B.

One solution to the problem of restoring data from a snapshot is to save the changes made to the data after the snapshot was taken. Saving the actual changes made to very large volumes of data can be problematic, however, introducing additional storage requirements. One way to reduce storage requirements for tracking changes is to use bitmaps, also referred to herein as maps, with the data divided into regions and each bit in the bitmap corresponding to a particular region of the data. Each bit is set to logical 1 (one) if a change to the data in the respective region has been made, and thus the bitmaps are sometimes referred to as data change maps. If the data have not changed, the respective bit is set to logical 0 (zero).

Accumulator map 210 is used to track changes made to data 110 after detached mirror (snapshot) 120B is detached. Three updates to data 110 are shown in the order in which the updates are made, including an update to region 2 (R2) in update 202, an update to region 6 (R6) in update 204, and an update to region 8 (R8) in update 206. Respective bits corresponding to respective regions R2, R6, and R8 are set to have a value of one in accumulator map 210 to indicate the regions that have changed in data 110 since detached mirror (snapshot) 120B was made.

The changes tracked by accumulator map 210 can then be applied in either direction. For example, the changes can be applied to the snapshot when there is a need for the snapshot to reflect the current state of the data. For example, referring back to FIG. 2, after update 202 is made to region 2 of data 110, region 2 of detached mirror (snapshot) 120B is no longer "synchronized" with data 110. To be synchronized with data 110, detached mirror (snapshot) 120B can be updated by applying the change made in update 202 to region 2 of detached mirror (snapshot) 120B. This change can be accomplished by copying the contents of data 110 to region 2 of detached mirror (snapshot) 120B.

Alternatively, to return to a previous state of the data before update 106A was made, the changed portion (region 2) of data 110 can be restored from (copied from) region 2 of detached mirror (snapshot) 120B. The change made in update 106A is thereby "backed out" without copying all of the data from the snapshot. The use of accumulator maps is described in further detail in the two related applications cited in the Cross Reference to Related Applications section of this application.

To save physical disk space, changes can be stored in temporary data storage areas such as volatile memory, but those changes are vulnerable to computer system, hardware, and software failures. In addition, storing the changes in temporary data storage areas typically requires that the snapshot and the data are stored in a common physical storage area that can be accessed by a common volatile memory. A requirement that the snapshot and the data be stored in a common physical data storage area can limit the number of snapshots that can be made of the data in organizations having limited resources or a very large amount of data. Furthermore, many applications suffer severe performance problems when more than one snapshot of a set of data is made due to the overhead involved in writing the data to multiple places.

What is needed is the ability to quickly synchronize mirrored copies of data that have become inconsistent. The solution should enable mirrored copies of data to be synchronized following a system crash without copying all of the data from one mirrored copy to another. Changes to the data should survive computer system, hardware and software failures and require minimal storage space. The solution should have minimal impact on performance of applications using the data.

SUMMARY OF THE INVENTION

The present invention provides a method, system, computer system and computer program product to maintain consistency between mirrored copies of data. A bitmap, also referred to as a dirty region map, is used to track changes made to data to facilitate recovery in the event of a system failure. This dirty region map identifies regions that are about to be updated as the update occurs. If a system failure occurs during the update, the dirty region map identifies regions that were being changed so that only those regions can be synchronized to restore consistency between the mirrored copies of data.

A second bitmap, also referred to as an accumulator map, is used to track changes made to data after a given point in time. This given point in time usually occurs when a snapshot of the mirrored data is taken, but updates to the accumulator map are not limited to updates when a snapshot is taken. This accumulator map enables the mirrored copies of data to be synchronized without copying all data from one mirrored copy to another. Only changes to the data made after the snapshot was taken are applied to synchronize the snapshot with the data so that all of the data is not copied. Once the snapshot is synchronized with the data, the snapshot can resume the role of an active mirror of the data.

When both the dirty region map and the accumulator map are to be updated, the dirty region map and the accumulator map are updated in parallel to reduce processing time and overhead. Updating the dirty-region map and the accumulator map in parallel means that, when both bitmaps are to be updated, an update to one of the bitmaps does not wait for completion of an update of the other of the bitmaps. This parallel processing enables fast restoration and synchronization of mirrored copies of data, while having minimal effect on performance of applications using the data.

BRIEF DESCRIPTION OF THE DRAWINGS

The present invention may be better understood, and its numerous objects, features and advantages made apparent to those skilled in the art by referencing the accompanying drawings.

FIGS. 1A and 1B provide an example of a storage environment in which data mirroring is used, as described above.

FIG. 4 shows an example of events related to updating primary data in a primary volume and a mirrored volume, updates to an accumulator map for tracking changes with respect to a snapshot of the mirrored data, and updates to a dirty region map for tracking regions being updated as the updates are being made.

FIG. 5 shows another example of events related to updating primary data in a primary volume and a mirrored volume, updates to an accumulator map for tracking changes with respect to a snapshot of the mirrored data, and updates to a dirty region map for tracking regions being updated as the updates are being made.

FIG. 6 shows another example of events related to updating primary data in a primary volume and a mirrored volume, updates to an accumulator map for tracking changes with respect to a snapshot of the mirrored data, and updates to a dirty region map for tracking regions being updated as the updates are being made.

FIG. 7 shows another example of events related to updating primary data in a primary volume and a mirrored volume, updates to an accumulator map for tracking changes with respect to a snapshot of the mirrored data, and updates to a dirty region map for tracking regions being updated as the updates are being made.

The use of the same reference symbols in different drawings indicates similar or identical items.

DETAILED DESCRIPTION

Figure 2:
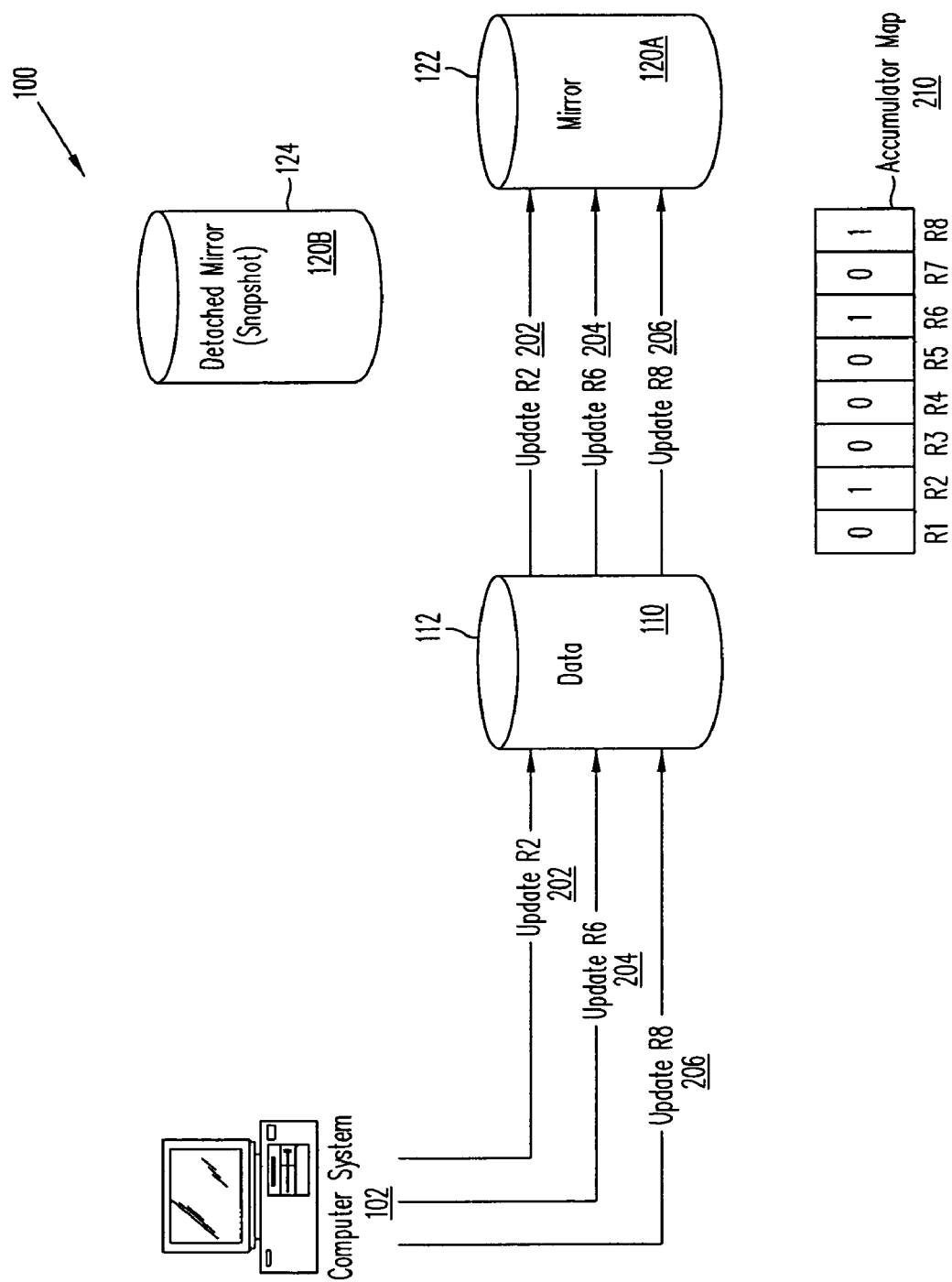
FIG. 2 shows a data change map for tracking changes in primary data with respect to a snapshot of the primary data taken at a given point in time, as described above.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method, system, computer system and computer program product to maintain consistency between mirrored copies of data. A bitmap, also referred to as a dirty region map, is used to track changes made to data to facilitate recovery in the event of a system failure. This dirty region map identifies regions that are being updated as the update occurs. If a system failure occurs during the update, the dirty region map identifies regions that were being changed so that only those regions can be synchronized to restore consistency between the mirrored copies of data.

A "dirty region" is one that is targeted for update by a given transaction. If a system failure occurs during the given transaction, the "dirty regions" can be synchronized to restore consistency between all mirrored copies of data without having to make complete copies of the data. When the given transaction is successfully completed, the dirty region map can be cleared, indicating that those regions are no longer targeted for update.

Another bitmap, also referred to as an accumulator map, is used to track changes made to data after a given point in time. This given point in time usually occurs when a snapshot of the mirrored data is taken, but the updates to the accumulator map are not limited to updates when snapshots are taken. This accumulator map enables the mirrored copies of data to be synchronized without copying all data from one mirrored copy to another. Only changes to the data made after the snapshot was taken are applied to synchronize the snapshot with the data so that all of the data is not copied. Once the snapshot is synchronized with the data, the snapshot can resume the role of an active mirror of the data. Preferably, the accumulator map is stored persistently along with the set of primary data to which changes are being tracked, thereby increasing the speed with which the synchronization process can be performed.

When both the dirty region map and accumulator map are to be updated, the dirty region map and the accumulator map are updated in parallel to reduce processing time and overhead. This enables fast restoration and synchronization of mirrored copies of data, while having minimal effect on performance of applications using the data. Updates of the accumulator map and dirty region map are described in further detail with reference to FIG. 3.

Figure 3:
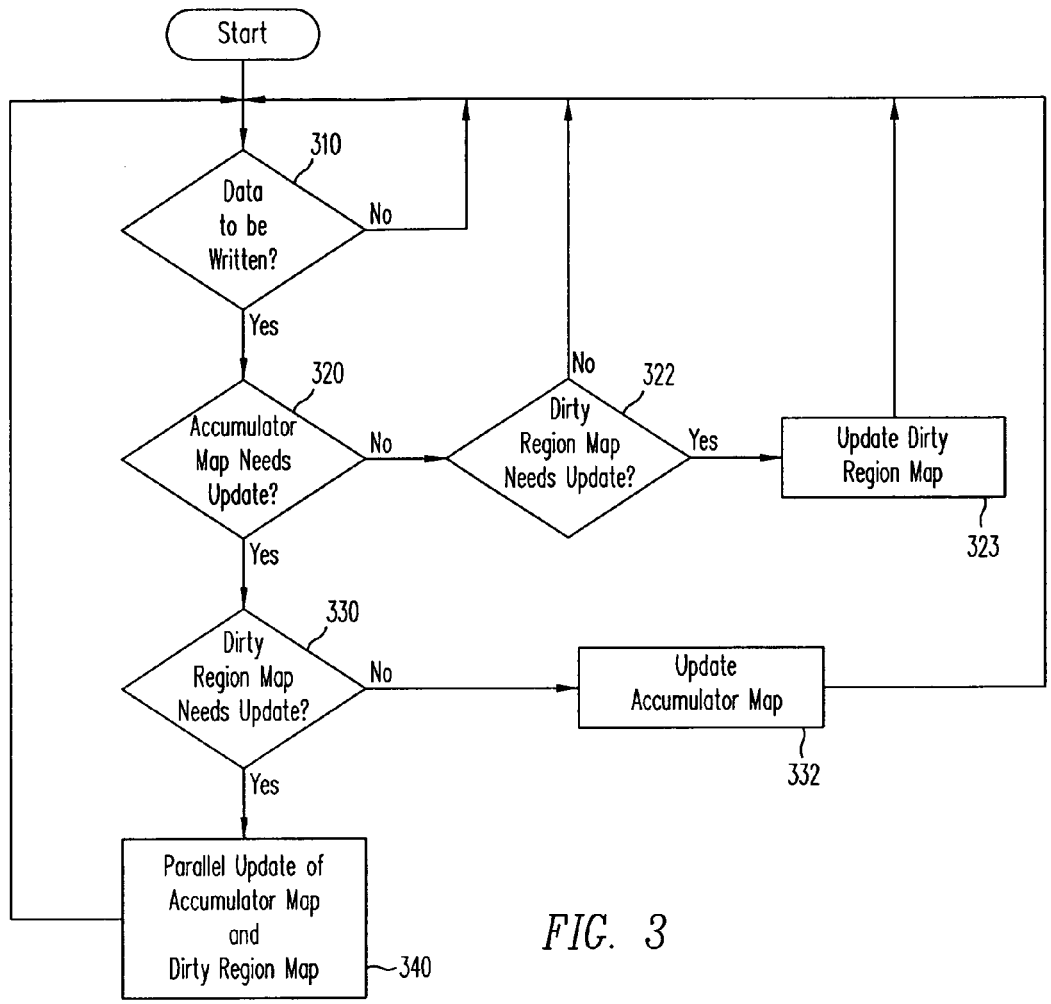
FIG. 3 is a flowchart for updating data change maps to maintain data consistency between mirrors in accordance with the present invention.

FIG. 3 is a flowchart of the updates to accumulator map and dirty region map of the present invention. At "Data to be Written" decision point 310, a determination is made whether data are to be written. If no data are to be written, control cycles through "Data to be Written" decision point 310 until data are to be written. If at "Data to be Written" decision point 310, data are to be written, control proceeds to "Accumulator Map Needs Update" decision point 320.

An accumulator map is updated whenever a change is made to primary data with respect to a snapshot of the primary data. However, if a subsequent update is made to a single region represented by the accumulator map, the respective bit corresponding to the region already has a value of one and no update is necessary. If at "Accumulator Map Needs Update" decision point 320, the accumulator map is to be updated, control proceeds to "Dirty Region Map Needs Update" decision point 330. If at "Accumulator Map Needs Update" decision point 320, the accumulator map does not need to be updated, control proceeds to "Dirty Region Map Needs Update" decision point 322.

If at "Dirty Region Map Needs Update" decision point 322, the dirty region map needs to be updated, control proceeds to "Update Dirty Region Map" step 323. A dirty region map is updated whenever a write transaction is targeted for a given region of the data. However, if a subsequent update is made to a single region represented by the dirty region map and the dirty region map has not yet been cleared, the respective bit corresponding to the dirty region already has a value of one and no update is necessary.

At "Update Dirty Region Map" step 323, only the dirty region map is updated, as the accumulator map did not need to be updated. From "Update Accumulator Map" step 332, control proceeds back to "Data to be Written" decision point 310 to determine whether primary data are to be updated.

If at "Dirty Region Map Needs Update" decision point 330, the dirty region map does not need to be updated, control proceeds to "Update Accumulator Map" step 332. At this point, only the accumulator map is updated, as the dirty region map did not need to be updated.

If at "Dirty Region Map Needs Update" decision point 330, the dirty region map needs to be updated, control proceeds to "Parallel Update of Accumulator Map and Dirty Region Map" step 340. To speed the update process, writes to the accumulator map and to the dirty region map are initiated in parallel, rather than being updated one after the other. By performing the updates in parallel rather than in sequence, overhead necessary to maintain mirror consistency is minimized. Control then proceeds back to "Data to be Written" decision point 310 to determine whether primary data are to be updated.

FIG. 4 shows an example of events related to updating primary data in a primary volume and a mirrored volume, updates to an accumulator map for tracking changes with respect to a snapshot of the mirrored data, and updates to a dirty region map for tracking regions being updated as the updates are being made.

In table 400, the column labeled Event 410 contains a series of events 4.1 through 4.13 tracking a set of changes to primary data. Data values for eight regions of primary data 420 and mirror data 430 are shown for purposes of illustration. The contents of primary data 420 are shown for each change to primary data and corresponding mirror data 430. Assume that a snapshot of primary data 420 is taken prior to the occurrence of any events, so that the snapshot appears with all eight data regions having no data.

Event 4.1 represents the start of a write to region 2 of primary data 420 and corresponding mirror data 430. At event 4.1, both region 2 of accumulator map 440 and region 2 of dirty region map 450 are initialized to indicate that region 2 is targeted for update. These updates to accumulator map 440 and dirty region map 450 are performed in parallel, because neither data change map has yet recorded a write to region 2. In event 4.2, data having a value of 'A' are written to region 2 of primary data 420. In event 4.3, data having a value of 'A' are also written to region 2 of mirror data 430. During normal operation, events 4.2 and 4.3 are performed as close as simultaneously as possible. In event 4.4, following the successful update of both region 2 of primary data 420 and region 2 of mirror data 430, dirty region map 450 is cleared.

Event 4.5 represents the start of a write to region 5 of primary data 420 and corresponding mirror data 430. At event 4.5, both region 5 of accumulator map 440 and region 5 of dirty region map 450 are initialized to indicate that region 5 is targeted for update. These writes to the data change maps are performed in parallel because neither data change map indicates an update to region 5. In event 4.6, data having a value of 'B' are written to region 5 of primary data 420. In event 4.7, data having a value of 'B' are also written to region 5 of mirror data 430. During normal operation, events 4.6 and 4.7 are performed as close as simultaneously as possible. In event 4.8, following the successful update of both region 5 of primary data 420 and region 5 of mirror data 430, dirty region map 450 is cleared.

Event 4.9 represents the start of a write to region 8 of primary data 420 and corresponding mirror data 430. At event 4.9, both region 8 of accumulator map 440 and region 8 of dirty region map 450 are initialized to indicate that region 8 is targeted for update. These writes to the data change maps are performed in parallel because neither data change map indicates an update to region 8. In event 4.10, data having a value of 'D' are written to region 8 of primary data 420. In event 4.11, data having a value of 'D' are also written to region 8 of mirror data 430. During normal operation, events 4.10 and 4.11 are performed as close as simultaneously as possible. In event 4.12, following the successful update of both region 8 of primary data 420 and region 8 of mirror data 430, dirty region map 450 is cleared.

Event 4.13 represents a start of a write to region 8 of primary data 420 and corresponding mirror data 430. At this point, accumulator map 440 already indicates that region 5 has been updated since the snapshot was taken prior to event 4.1. Therefore, accumulator map 440 does not need to be updated. However, dirty region map 450 has been cleared since the update to region 5 in events 4.6 and 4.7. Therefore, region 5 of dirty region map 450 is updated to indicate a pending update to region 5.

Following event 4.13, if the system updating primary data 420 and mirror data 430 were to crash, accumulator map 440 would be used to update regions 2, 5 and 8 of the snapshot to synchronize the snapshot with the current state of primary data 420. Dirty region map 450 would be used to copy data from primary data 420 to mirror data 430, or vice versa, to ensure that the two mirrored copies of primary data are consistent. The choice of whether to "rollback" the partially completed transaction or whether to apply the change to the other mirrored copy is an implementation detail; both choices are within the scope of the present invention.

FIG. 5 shows another example of events related to updating primary data in a primary volume and a mirrored volume. In this example, a system failure occurs, and the use of the accumulator map and dirty region map to restore consistency between copies of mirrored data is described.

In table 500, the column labeled Event 510 contains a series of events 5.1 through 5.7 tracking a set of changes to primary data. Data values for eight regions of primary data 520 and mirror data 530 are shown for purposes of illustration. The contents of primary data 520 are shown for each change to primary data and corresponding mirror data 530. Assume that a snapshot of primary data 520 is taken prior to the occurrence of any events, so that the snapshot appears with all eight data regions having no data.

Event 5.1 represents the start of a write to region 2 of primary data 520 and corresponding mirror data 530. At event 5.1, both region 2 of accumulator map 540 and region 2 of dirty region map 550 are initialized to indicate that region 2 is targeted for update. These updates to accumulator map 540 and dirty region map 550 are performed in parallel, because neither data change map has yet recorded a write to region 2. In event 5.2, data having a value of 'A' are written to region 2 of primary data 520. In event 5.3, data having a value of 'A' are also written to region 2 of mirror data 530. During normal operation, events 5.2 and 5.3 are performed as close as simultaneously as possible. In event 5.4, following the successful update of both region 2 of primary data 520 and region 2 of mirror data 530, dirty region map 550 is cleared.

Event 5.5 represents the start of a write to region 5 of primary data 520 and corresponding mirror data 530. At event 5.5, both region 5 of accumulator map 540 and region 5 of dirty region map 550 are initialized to indicate that region 5 is targeted for update. These writes to the data change maps are performed in parallel because neither data change map indicates an update to region 5. In event 5.6, data having a value of 'B' are written to region 5 of primary data 420. However, in event 5.7, the system performing the write operations to primary data 520 and mirror data 530 fails.

At the point in time represented by event 5.7, data in region 5 of primary data 520 have a value of 'B', but data in region 5 of mirror data 530 have a null value, thereby exhibiting an inconsistency. This inconsistency is also shown in dirty region map 550, because the bit for region 5 has a value of one. In order to make primary data 520 and mirror data 530 consistent, the data of region 5 must be copied from one mirrored copy to the other.

FIG. 6 shows another example of events related to updating primary data in a primary volume and a mirrored volume. In this example, a system failure occurs, and the use of the accumulator map and dirty region map to restore consistency between copies of mirrored data is described. Also in this example, the dirty region map is updated less frequently, requiring less overhead but requiring additional resources to maintain consistent copies of mirrored data.

In table 600, the column labeled Event 610 contains a series of events 6.1 through 6.7 tracking a set of changes to primary data. Data values for eight regions of primary data 620 and mirror data 630 are shown for purposes of illustration. The contents of primary data 620 are shown for each change to primary data and corresponding mirror data 630. Assume that a snapshot of primary data 620 is taken prior to the occurrence of any events, so that the snapshot appears with all eight data regions having no data.

Event 6.1 represents the start of a write to region 2 of primary data 620 and corresponding mirror data 630. At event 6.1, both region 2 of accumulator map 640 and region 2 of dirty region map 650 are initialized to indicate that region 2 is targeted for update. These updates to accumulator map 640 and dirty region map 650 are performed in parallel, because neither data change map has yet recorded a write to region 2. In event 6.2, data having a value of 'A' are written to region 2 of primary data 620. In event 6.3, data having a value of 'A' are also written to region 2 of mirror data 630. During normal operation, events 6.2 and 6.3 are performed as close as simultaneously as possible.

Note that, unlike in FIG. 5, dirty region map 650 is not cleared following the successful update of both region 2 of primary data 620 and region 2 of mirror data 630. This omission saves overhead in writing to dirty region map 650. For example, a certain number of bits may be allowed to "become dirty" before the dirty region map is cleared. The number of bits allowed to become dirty can be established by determining an acceptable number of regions that can be synchronized in a specified amount of time. For example, assume that three regions can be acceptably synchronized without degrading system performance. Two of three writes to dirty region map 650 therefore can be saved without sacrificing performance.

Event 6.4 represents the start of a write to region 5 of primary data 620 and corresponding mirror data 630. At event 6.4, both region 5 of accumulator map 640 and region 5 of dirty region map 650 are initialized to indicate that region 5 is targeted for update. These writes to the data change maps are performed in parallel because neither data change map indicates an update to region 5. In event 6.5, data having a value of 'B' are written to region 5 of primary data 620. However, in event 6.6, the system performing the write operations to primary data 620 and mirror data 630 fails.

At the point in time represented by event 6.6, data in region 5 of primary data 620 have a value of 'B', but data in region 5 of mirror data 630 have a null value, thereby exhibiting an inconsistency. This inconsistency is also shown in dirty region map 650, because the bit for region 5 has a value of one. Also note that the bit for region 2 in dirty region map 650 also has a value of one. Because three bits are not yet dirty, dirty region map 650 has not yet been cleared. Using the dirty region map 650 to make primary data 620 and mirror data 630 consistent will involve copying the data of both regions 2 and 5 from mirrored copy to the other.

FIG. 7 shows another example of events related to updating primary data in a primary volume and a mirrored volume. In this example, the accumulator map is cleared when a new snapshot is taken.

In table 700, the column labeled Event 710 contains a series of events 7.1 through 7.10 tracking a set of changes to primary data. Data values for eight regions of primary data 720 and mirror data 730 are shown for purposes of illustration. The contents of primary data 720 are shown for each change to primary data and corresponding mirror data 730. Assume that a snapshot of primary data 720 is taken prior to the occurrence of any events, so that the snapshot appears with all eight data regions having no data.

Event 7.1 represents the start of a write to region 2 of primary data 720 and corresponding mirror data 730. At event 7.1, both region 2 of accumulator map 740 and region 2 of dirty region map 750 are initialized to indicate that region 2 is targeted for update. These updates to accumulator map 740 and dirty region map 750 are performed in parallel, because neither data change map has yet recorded a write to region 2. In event 7.2, data having a value of 'A' are written to region 2 of primary data 720. In event 7.3, data having a value of 'A' are also written to region 2 of mirror data 730. During normal operation, events 7.2 and 7.3 are performed as close as simultaneously as possible. Note that, following the successful update of both region 2 of primary data 720 and region 2 of mirror data 730, dirty region map 750 is not cleared. Assume that a maximum of four dirty bits are allowed before dirty region map 750 is cleared.

Event 7.4 represents the start of a write to region 5 of primary data 720 and corresponding mirror data 730. At event 7.4, both region 5 of accumulator map 740 and region 5 of dirty region map 750 are initialized to indicate that region 5 is targeted for update. These writes to the data change maps are performed in parallel because neither data change map indicates an update to region 5. In event 7.5, data having a value of 'B' are written to region 5 of primary data 720. In event 7.6, data having a value of 'B' are also written to region 5 of mirror data 730. During normal operation, events 7.5 and 7.6 are performed as close as simultaneously as possible. Note that, following the successful update of both region 2 of primary data 720 and region 2 of mirror data 730, dirty region map 750 is not cleared.

Event 7.7 clears accumulator map 740. For example, the accumulator map can be cleared if a new snapshot of primary data is taken. Assume that a new snapshot having data values A_ _B_ _ _is taken at the point in time represented by event 7.7.

Event 7.8 represents the start of a write to region 8 of primary data 720 and corresponding mirror data 730. At event 7.8, both region 8 of accumulator map 740 and region 8 of dirty region map 750 are initialized to indicate that region 8 is targeted for update. These writes to the data change maps are performed in parallel because neither data change map indicates an update to region 8. In event 7.9, data having a value of 'D' are written to region 8 of primary data 720. In event 7.10, data having a value of 'D' are also written to region 8 of mirror data 730.

At the point in time following event 7.10, if a decision were made to synchronize the snapshot made at event 7.7 with primary data 720, accumulator map 740 indicates that data in region 8 should be copied from primary data 720 to the snapshot. Alternatively, if primary data 720 were to be restored to its state as of the point in time represented by event 7.7, region 8 of the snapshot would be copied to primary data 720, thereby backing out the update writing a value of 'D' to region 8.

If a system failure were to occur at the point in time following event 7.10, three regions are indicated as dirty by dirty region map 750. Data for regions 2, 5 and 8 would be copied from one mirrored copy to the other. Note that while data for regions 2, 5 and 8 are consistent, three writes to dirty region map have been saved by not clearing the dirty region map 750 with each update. This savings in overhead was traded for the additional work to synchronize the three regions by allowing four regions to become dirty before the dirty region map is cleared.

An Example Computing and Network Environment

Figure 8:
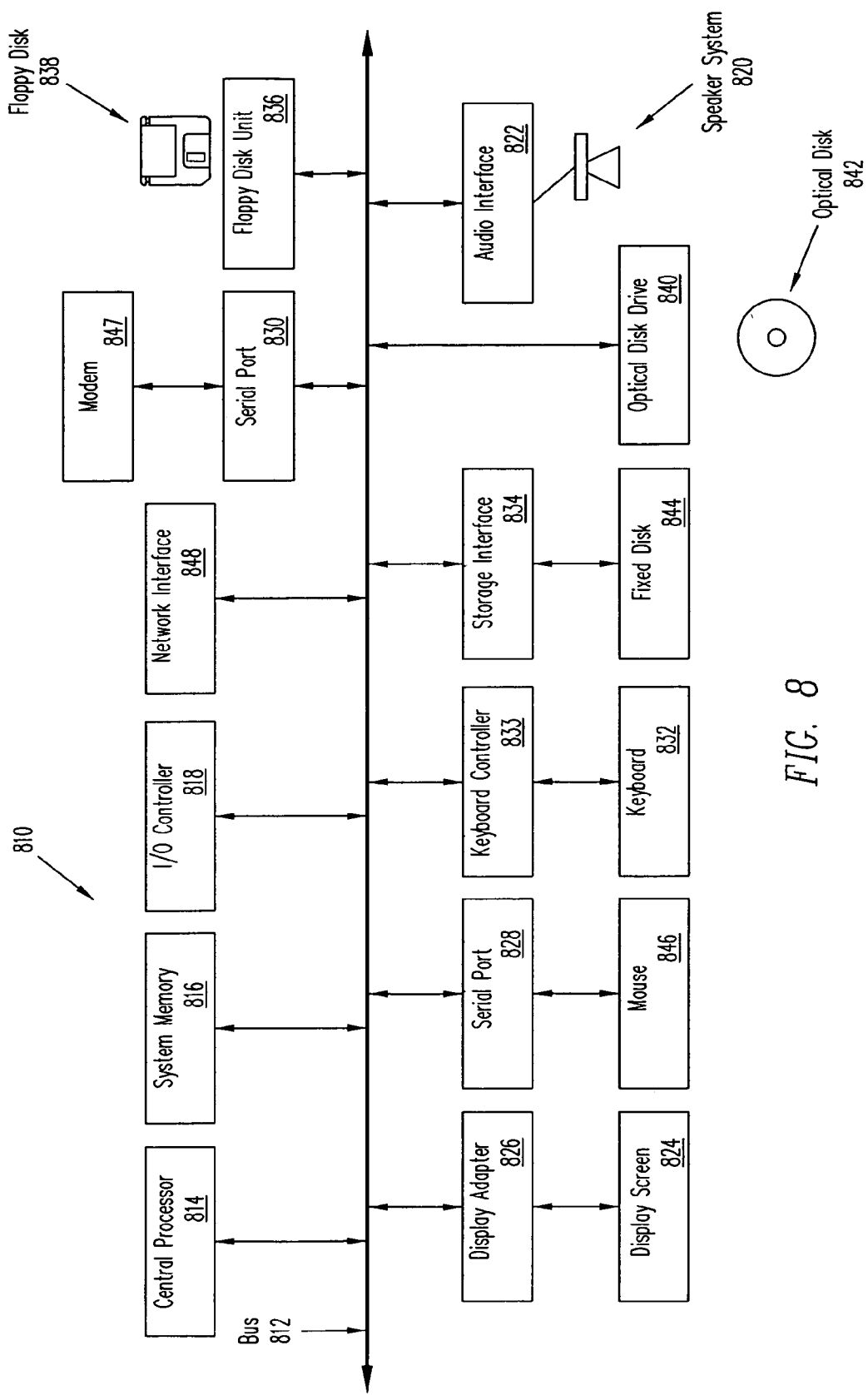
FIG. 8 is a block diagram illustrating a computer system suitable for implementing embodiments of the present invention.

FIG. 8 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or the like), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834, a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., CD-ROM drive 840), floppy disk unit 836 or other storage medium. Additionally, applications may be in the form of electronic signals modulated in accordance with the application and data communication technology when accessed via network modem 847 or interface 848.

Storage interface 834, as with the other storage interfaces of computer system 810, may connect to a standard computer readable medium for storage and/or retrieval of information, such as a fixed disk drive 845. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliance, X-window terminal or other such computing device. The operating system provided on computer system 810 may be MS-DOS®, MS-WINDOWS®, OS/2®, UNIX®, Linux® or other known operating system. Computer system 810 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 810). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 9:
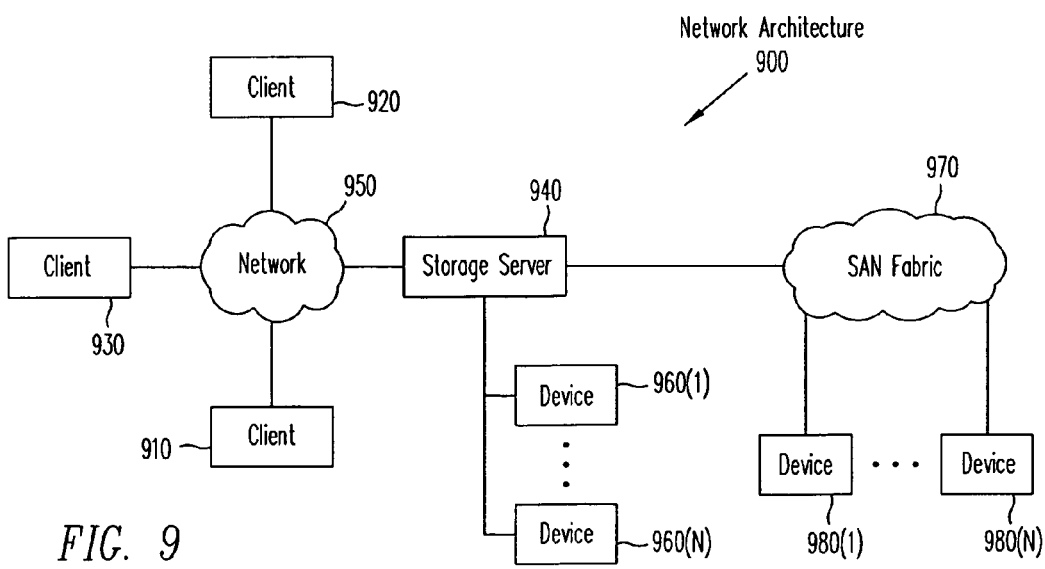
FIG. 9 is a block diagram illustrating a network environment in which data change maps according to embodiments of the present invention may be used.

FIG. 9 is a block diagram depicting a network architecture 900 in which client systems 910, 920 and 930, as well as a storage server 940 (any of which can be implemented using computer system 810), are coupled to a network 950. Storage server 940 is further depicted as having storage devices 960(1)-(N) directly attached thereto. Storage server 940 is also connected to a SAN fabric 970, although connection to a storage area network is not required for operation of the invention. SAN fabric 970 supports access to storage devices 980(1)-(N) by storage server 940, and so by client systems 910, 920 and 930 via network 950.

With reference to computer system 810, modem 847, network interface 848 or some other method can be used to provide connectivity from computer system 810 to network 950. Client systems 910, 920 and 930 are able to access information on storage server 940 using, for example, a web browser or other client software (not shown). Such a client allows client systems 910, 920 and 930 to access data hosted by storage server 940 or one of storage devices 960(1)-(N) or 980(1)-(N). FIG. 9 depicts the use of a network such as the Internet for exchanging data, but the present invention is not limited to the Internet or any particular network-based environment.

Advantages of the present invention are many. Consistency can be maintained among mirrored copies of data with minimal overhead. The ability to synchronize only a subset of the snapshot data and primary data greatly speeds the process of synchronization and restoration. Furthermore, since each write to primary data involves no more than two writes performed in parallel to data change maps, little overhead is necessary to achieve significant gains in performance. Minimal storage space is used to store the respective data change maps, and a minimum number of updates to the data change maps are made to synchronize data with a snapshot, thereby enhancing the efficiency without sacrificing performance of the applications maintaining the data.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
  updating a first bitmap upon starting a write operation to data, wherein the first bitmap is a dirty region map associated with the data; and
  before completing the updating of the first bitmap, beginning to update a second bitmap in response to the write operation to the data, wherein the second bitmap is an accumulator map associated with the data.

2. The method of claim 1 further comprising:
using the first bitmap to restore a region of the data when a system performing the write operation fails before the write operation is completed.

3. The method of claim 1 further comprising:
using the second bitmap to synchronize a portion of the data with a portion of a snapshot of the data such that the data and the snapshot are the same after the synchronization.

4. The method of claim 3 wherein
the second bitmap tracks changes in the data with respect to the snapshot of the data.

5. The method of claim 4 further comprising:
re-initializing the second bitmap when the snapshot is taken.

6. The method of claim 1 further comprising:
re-initializing the first bitmap when the write operation is completed.

7. The method of claim 1 further comprising:
re-initializing the first bitmap when a given number of regions of the first bitmap are dirty.

8. The method of claim 1 further comprising:
re-initializing the second bitmap when a snapshot of the data is taken.

9. The method of claim 1, wherein the updates to the first bitmap and the second bitmap are initiated in parallel.

10. A system comprising:
first updating means for updating a first bitmap upon starting a write operation to data, wherein the first bitmap is a dirty region map associated with the data; and
second updating means for beginning to update a second bitmap in response to the write operation to the data, wherein
the beginning to update the second bitmap is performed before completing the updating the first bitmap, and
the second bitmap is an accumulator map associated with the data.

11. The system of claim 10 further comprising:
using means for using the first bitmap to restore a region of the data when a system performing the write operation fails before the write operation is completed.

12. The system of claim 10 further comprising:
using means for using the second bitmap to synchronize a portion of the data with a portion of a snapshot of the data such that the data and the snapshot are the same after the synchronization.

13. The system of claim 12 wherein
the second bitmap tracks changes in the data with respect to the snapshot of the data.

14. A system comprising:
a first updating module to update a first bitmap upon starting a write operation to data, wherein the first bitmap is a dirty region map associated with the data; and
a second updating module to begin to update a second bitmap in response to the write operation to the data, wherein
updating the second bitmap begins before completing the updating the first bitmap, and
the second bitmap is an accumulator map associated with the data.

15. The system of claim 14 further comprising:
a restoration module to use the first bitmap to restore a region of the data when a system performing the write operation fails before the write operation is completed.

16. The system of claim 14 further comprising:
a synchronization module to use the second bitmap to synchronize a portion of the data with a portion of a snapshot of the data such that the data and the snapshot are the same after the synchronization.

17. The system of claim 16 wherein
the second bitmap tracks changes in the data with respect to the snapshot of the data.

18. A computer readable media comprising program instructions executable to:
update a first bitmap upon starting a write operation to data, wherein the first bitmap is a dirty region map associated with the data;
begin to update a second bitmap in response to the write operation to the data, wherein
updating the second bitmap begins before completing the updating the first bitmap, and
the second bitmap is an accumulator map associated with the data.

19. The computer readable media of claim 18, wherein the program instructions are further executable to:
use the first bitmap to restore a region of the data when a system performing the write operation fails before the write operation is completed.

20. The computer readable media of claim 18, wherein the program instructions are further executable to:
use the second bitmap to synchronize a portion of the data with a portion of a snapshot of the data such that the data and the snapshot are the same after the synchronization.

21. The computer readable media of claim 20 wherein
the second bitmap tracks changes in the data with respect to the snapshot of the data.

22. A computer system comprising:
a processor for executing instructions; and
a memory for storing the instructions, the instructions comprising:
first updating instructions to update a first bitmap upon starting a write operation to data, wherein the first bitmap is a dirty region map associated with the data; and
second updating instructions to begin to update a second bitmap in response to the write operation to the data, wherein
updating the second bitmap begins before completing the updating the first bitmap, and
the second bitmap is an accumulator map associated with the data.

23. The computer system of claim 22 wherein the instructions further comprise:
restoration instructions to use the first bitmap to restore a region of the data when a system performing the write operation fails before the write operation is completed.

24. The computer system of claim 22 wherein the instructions further comprise:
synchronization instructions to use the second bitmap to synchronize a portion of the data with a portion of a snapshot of the data such that the data and the snapshot are the same after the synchronization.

25. The computer system of claim 24 wherein
the second bitmap tracks changes in the data with respect to the snapshot of the data.

* * * * *